W. R. BRANHAM.
GAGE PIN FOR PRESS PLATENS.
APPLICATION FILED JAN. 28, 1915.
1,175,696.
Patented Mar. 14, 1916.
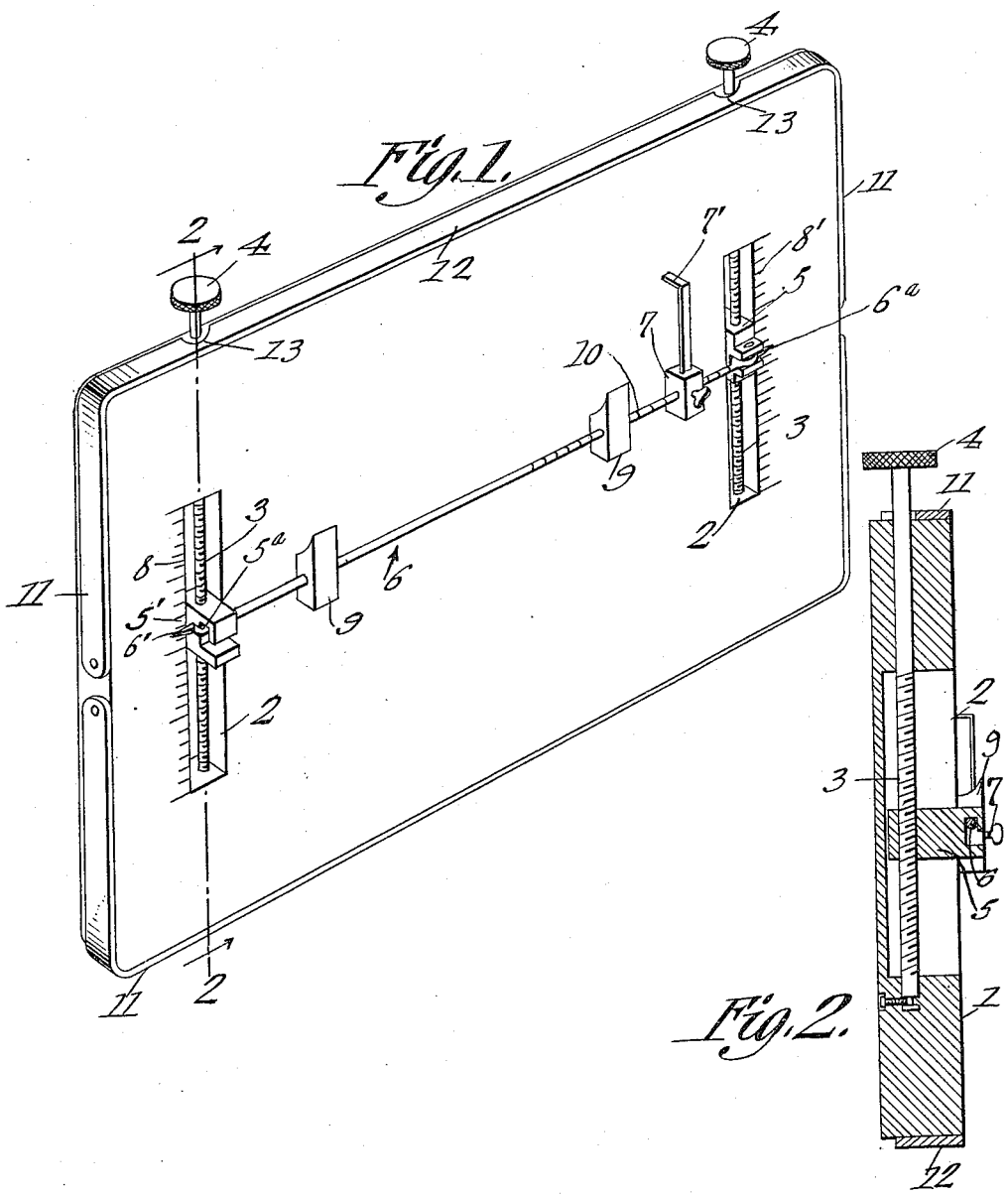
W. R. Branham
Inventor

UNITED STATES PATENT OFFICE.

WALTER RUSSELL BRANHAM, OF FORT VALLEY, GEORGIA.

GAGE-PIN FOR PRESS-PLATENS.

1,175,696.  Specification of Letters Patent.  Patented Mar. 14, 1916.

Application filed January 28, 1915. Serial No. 4,919.

*To all whom it may concern:*

Be it known that I, WALTER RUSSELL BRANHAM, a citizen of the United States, residing at Fort Valley, in the county of Houston and State of Georgia, have invented a new and useful Gage-Pin for Press-Platens, of which the following is a specification.

The present invention relates to improvements in gage pins for press platens, one object of the invention, being the provision of a device adapted to be carried by the platen, and whereby the same may be rapidly gaged to permit of the proper presentation of a sheet of paper for printing thereupon, the parts for operating the same being readily accessible from the upper edge of the platen so that the paper receiving gages may be adjusted transversely and longitudinally of the platen and placed at a selected and proper gage location.

A further object of the present invention, is the provision of a simple and inexpensive device of this character which is readily applied to the platen, and which will not interfere with the clamping plates carried thereby.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a perspective view of a job printing press platen equipped with the present invention. Fig. 2 is a section taken on the line 2—2 thereof.

Referring to the drawings, the numeral 1 designates the platen, which may be taken indicative of any form of platen used in connection with job printing presses, the same being provided with the two parallel rectangular recesses 2, which are sufficiently spaced to permit of the proper presentation of the type therebetween.

Mounted longitudinally of each respective recess 2 and accessible through one edge of the platen 1 is a feed screw 3, said feed screw being provided with the milled knob 4, so that the same may be rotated exteriorly of the platen. Thus in this construction, two of such feed screws 3 are employed, one for each of the respective recesses or sockets 2.

Carried by each of the feed screws and projected within the respective sockets or recesses 2 is a feed block 5—5′. The block 5 forms a support for the hinging end of the gage carrying strip 6 which is adapted to swing to and from to be extended longitudinally of the platen 1 adjacent the outer surface thereof, its free end being seated in the L-shaped slot 5ª of the block 5′, so that when the feed screws 3 are manipulated, the said gage bar 6 will be moved transversely of the platen 1 to assume the desired position thereupon.

Carried upon the gage bar 6 adjacent the block 5 is a side gage pin carrying member 7, whose point or pin 7′ is adapted to be disposed in coöperation with the face of the platen 1. The free end 6′ of the gage bar 6 coöperates with the scale 8 while a pointer 6ª coöperates with the scale 8′. Thus, when operating the screws 3, the pointer 6ª and the free end 6′ of the bar 6 will indicate in coöperation with the scales 8 and 8′, the relative position of the bar 6 upon the platen, so that the present device may be adjusted according to the size of the work relative thereto and thus present the longitudinally slidable gage pins or members 9, there being two disposed for sliding movement upon the bar 6 between the respective recesses or sockets 2.

In order to properly gage the member 7, the gage marks 10 are formed upon the bar 6, thus permitting the said member to be adjusted to an exactness longitudinally of the bar, so that the proper width of the type form may be gaged thereupon to thus gage the position of the side edge of the matter to be printed upon, while the pins 9 hold the lower edge of such matter at right angles to the pin 7′.

Carried by the platen 1 are the usual clamping members 11 and 12, the member 12 of which is provided with the recesses 13, so that the same may be fitted astride of the respective feed screws 3, and thus properly clamp the paper as is usual upon the platen.

From the foregoing description, it is evident that the present device may be readily and quickly adjusted to permit of the proper disposition of the bar 6 and the gage members or pins 7′ and 9 in the proper position relative to the platen so that the article to be printed may be properly presented to the type form during the first movement of the platen thereto.

By placing the knobs 4 in ready access, the printer can very quickly and easily "make ready" for the work without the necessity of manipulating the platen and thus printing thereupon each time that it is necessary to change the type for a new job. With the present device it is merely necessary to measure the type forms, so that the gage members or pins 7' and 9 may be adjusted relatively to the width thereof, while the gage bar 6 may be moved up and down thereon according to the vertical length thereof. The scales 8 and 8' are preferably marked to indicate 6 pica units, as six picas equal 1 inch. It is also apparent that by knowing the size of paper and the type form that the present device can be "set" or adjusted before the type is placed on the press, this being possible as the number of picas upon the bottom side of the type form may be ascertained before placing the type form in the press.

What is claimed is:—

A printing platen having two parallel recesses, two feed screws mounted in the platen and extending through said recesses, two blocks, slidable in said recesses and threadedly engaging said screws, a gage bar having one end hingedly connected to one block, the other block being provided with an L-shaped slot to receive the free end of the bar, and gage elements carried slidably upon the bar between the blocks.

In testimony that I claim the foregoing as my own, I have hereto affixed my signature in the presence of two witnesses.

WALTER RUSSELL BRANHAM.

Witnesses:
  EMMETT HOUSER,
  G. C. BARKER.

Copies of this patent may be obtained for five cents each, by addressing the "Commissioner of Patents, Washington, D. C."